Figure 1:
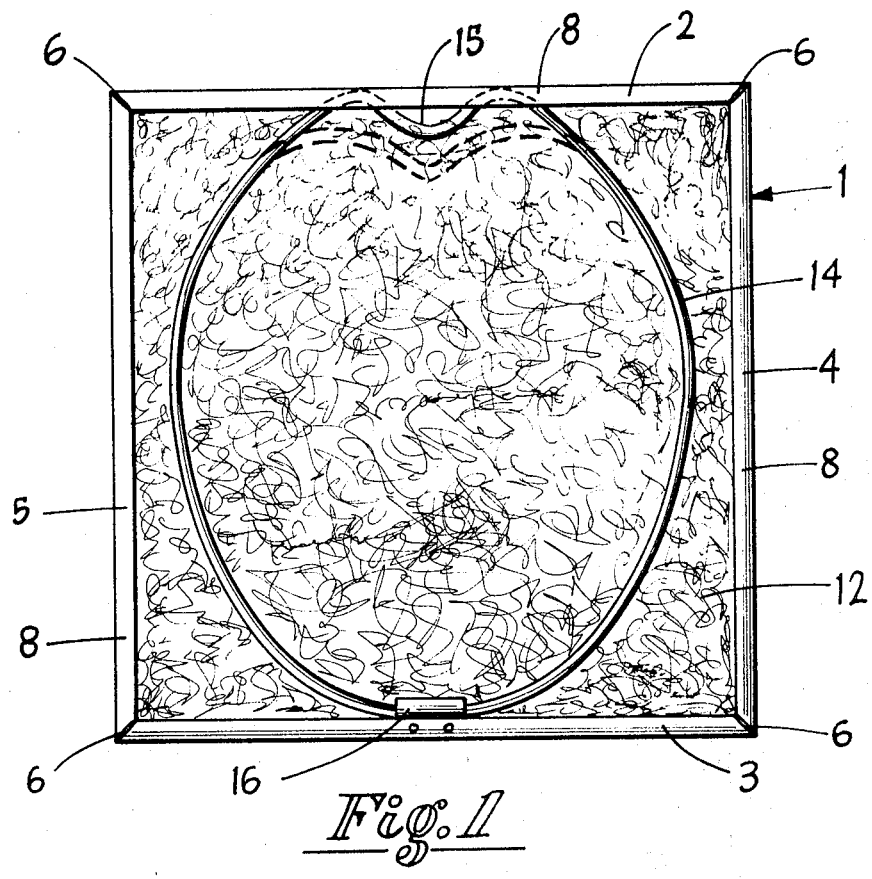

United States Patent [19]
Bishop

[11] 3,774,377
[45] Nov. 27, 1973

[54] FILTER ASSEMBLY WITH REPLACEABLE FILTER ELEMENT

[75] Inventor: George H. Bishop, Louisville, Ky.

[73] Assignee: America Air Filter Company, Inc., Louisville, Ky.

[22] Filed: Apr. 21, 1972

[21] Appl. No.: 246,337

[52] U.S. Cl.............. 55/493, 40/156, 55/501, 55/504, 55/509, 55/DIG. 31
[51] Int. Cl............................................ B01d 27/08
[58] Field of Search.................. 55/490, 493, 495, 55/501, 504, 509, DIG. 31; 160/371, 379–381; 220/55 AN, 55 G, 55 R; 40/156, 157, 153

[56] References Cited
UNITED STATES PATENTS

| | | | |
|---|---|---|---|
| 1,334,780 | 3/1920 | Morgan................................ | 40/156 |
| 1,713,224 | 5/1929 | Gunter........................... | 220/55 AN |
| 3,075,334 | 1/1963 | Nutting.......................... | 55/DIG. 31 |
| 3,557,478 | 1/1971 | Sitzberger.............................. | 40/156 |

FOREIGN PATENTS OR APPLICATIONS

| | | | |
|---|---|---|---|
| 618,051 | 8/1935 | Germany ............................. | 40/156 |
| 360,267 | 3/1962 | Switzerland........................... | 55/490 |

*Primary Examiner*—Bernard Nozick
*Attorney*—Ralph B. Brick et al.

[57] ABSTRACT

An improved fluid filter assembly with a replaceable filter element having a frame, channel shaped in cross-section defining a shallow box with an upstream and downstream opening therein to permit fluid flow therethrough and a foraminous filter supporting member adjacent to one of the openings; a fibrous filter mat covering the foraminous member and having marginal portions extending into the channel shaped frame; and, a resilient endless retainer removably engaging the fibrous filter mat by nesting in the channel shaped frame, the resilient endless retainer being an endless loop pivotally attached to the exterior of one extremity of the channel shaped frame, the loop including an inwardly extending groove portion at a position opposite the portion of the loop which is pivotally attached to the channel shaped frame, the inwardly engaging portion being adapted for removable engagement with the interior of the channel shaped frame.

6 Claims, 2 Drawing Figures

Patented Nov. 27, 1973

3,774,377

FILTER ASSEMBLY WITH REPLACEABLE FILTER ELEMENT

BACKGROUND OF THE INVENTION

This invention relates to a filter assembly and, more particularly, to a filter assembly with a replaceable filter element including a pivotally mounted retaining structure.

Filters presently used in air conditioners, heating systems, and the like, generally include a frame or support formed as a shallow box of usually rectangular configuration including fibrous filter mat of a basic core of loosely packed glass fibers bound together by a resinous coating with marginal portions disposed in the channel shaped sides. When such filters become clogged or dirty, they are usually discarded. Discarding the prior art filters entails considerable economic waste as the frame and the supporting surface for the filter medium are not usually damaged or otherwise rendered useless by clogging of the filter medium.

SUMMARY OF THE INVENTION

In the present invention, it is recognized that it is desirable to provide a filter assembly having a disposable and replaceable filter medium. Furthermore, it is recognized that it is desirable to provide a filter assembly having a durable frame and filter medium supporting means. Even further, it is recognized that it is desirable to provide a filter assembly having a rigid frame and manually releasable means for retaining a filter medium in a fixed position in the frame.

The present invention advantageously provides a straightforward arrangement for the preparation of an air filter assembly having a disposable and replaceable filter medium. The present invention further provides a filter assembly having a frame, channel shaped in cross-section, and having resilient means releasably holding a filter medium in the frame.

Various other features of the present invention will become obvious to those skilled in the art upon reading the disclosure set forth hereinafter.

More particularly, the present invention provides a fluid treating filter assembly comprising an inwardly extending channel shaped flow through frame having an upstream and downstream opening therein providing spaced opposed marginal top and bottom flanges, a foraminous plate extending across at least one of the openings of the frame within the channels and supported on the adjacent flange thereof, a sheet of filter medium supported on said plate and having its marginal portions extending into the channels of the frame; and, a resilient endless retainer pivotally attached along the other opening of the frame removably engaging the filter medium in the channel shaped frame.

It is to be understood that the description of the examples of the present invention given hereinafter are not by way of limitation and various modifications within the scope of the present invention will occur to those skilled in the art upon reading the disclosure set forth hereinafter.

Figure 2:
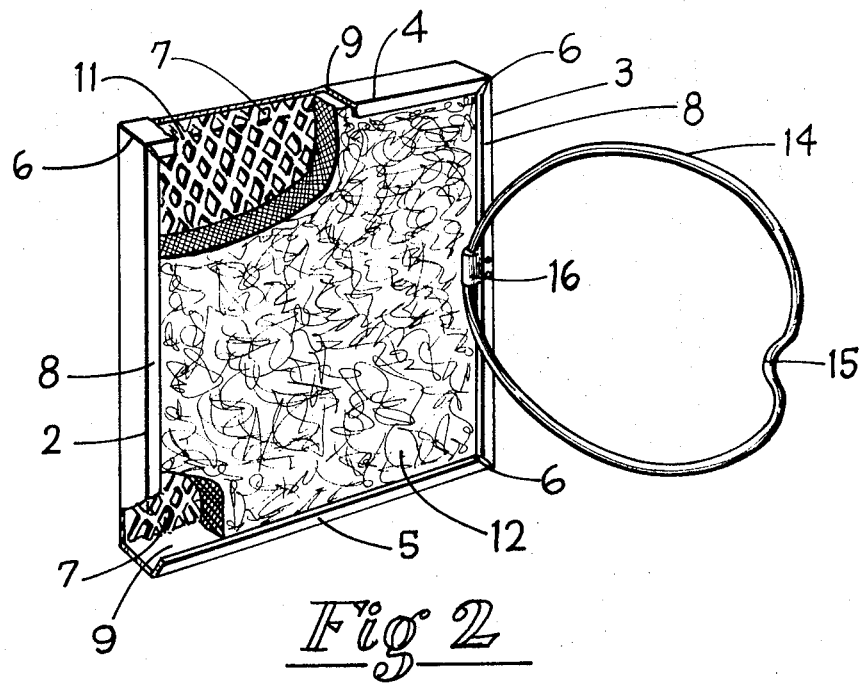

Referring to the drawing:

FIG. 1 is a plan view of a filter assembly of the present invention including phantom lines illustrating means for disengaging a pivotal resilient retainer from a filter frame; and, FIG. 2 is a perspective view of FIG. 1 with certain portions thereof cutaway.

In FIG. 1 of the drawing, there is shown a filter assembly 1 of generally rectangular configuration comprising channel shaped side members 2 and 3, and channel shaped end members 4 and 5. The side members 2 and 3, and the end members 4 and 5 are joined at their respective ends, at 6 in any suitable manner, such as, for example, by soldering, welding, riveting, or the like, or they may be integral to form a shallow rectangular box frame. Each of the side and end members are substantially U-shaped in cross-section and define a channel having a relatively wide bottom flange 7 and a relatively narrow overhanging top flange 8, bottom flange 7 and top flange 8 being disposed in a plane substantially parallel to each other and defining a downstream and upstream opening therein, respectively, for fluid flow therethrough. Disposed between the bottom and top flanges 7 and 8, respectively, is an intermediate portion 9 constituting the sides of the shallow formed box by the channel shaped members. The intermediate member 9 of the channel shaped support members 2, 3, 4, and 5 is secured along the longitudinal edges thereof to the outer peripheral edges of the flanges 7 and 8. On the bottom flange 8, there is placed a rectangular foraminous or open mesh sheet 11 for supporting a filter medium 12.

The channel members 2, 3, 4, and 5 are each formed of suitable sheet metal but it is to be understood that they may be formed by the extrusion of a metal or plastic and may be joined as above described in any suitable well-known manner. The filter medium supporting sheet 11 is made from an open mesh sheet of metal commonly known as "expanded metal" and is attached to the flange 7 by any suitable and appropriate means. It is realized that the filter medium supporting sheet 11 may be formed by other means, such as, for example, by a plastic molding process, or it may be wire mesh material or any other support material which includes an open area in the foraminous material of generally at least 85 percent of the total sheet area.

A sheet or mat of fibrous medium 12 cut to the appropriate size and configuration fits the filter assembly 1 resting on the support 11 and engaging with the channel intermediate member 9. While any fibrous filter material may be used, a preferred material is one of nonwoven spun fiberglas.

A spring retainer 14 formed of a single length of spring wire or rod is bent to form an endless loop having an inwardly extending groove 15 therein and is adaptable to fit within the channel shaped side 2. Spring retainer 14 is pivotally attached by pivot member 16 to the top flange 8 at the channel shaped side 3 and the portion of the spring retainer 14, being pivotally attached by pivot member 16 to the frame, is in alignment with the inwardly extending groove 15. As shown by phantom lines in FIG. 1, the inwardly extending groove 15 when manually moved inwardly of the loop, the spring retainer 14 is disengaged from the channel support 2. Release of the inwardly extending groove 15 at a point between the underside of flange 8 of channel shaped side support 2 and the fibrous medium 12, spring retainer 14 engages with the channel shaped side support 2. It is realized that the spring retainer 14, being made of a resilient material, may also be adaptable for engagement within channel shaped supports 4 and 5 as well as channel shaped side support 2.

To insert filter medium 12 in the filter assembly 1, a mat of filter medium 12 is placed on the support 11 with the marginal edges loosely placed in channel members 2, 3, 4, and 5. The spring retainer 14 is grasped at the inwardly extending groove 15 and contracted to the form shown by the phantom lines in FIG. 1. Spring retainer 14 is then pressed against the filter medium 12 wherein release of the inwardly extending groove 15 permits the retainer 14 to engage with the underside of flange 8 of channel support member 2.

To remove the filter medium 12 for replacement when it becomes clogged or dirty, the inwardly extending groove 15 is grasped by fingers and contracted to the form shown in phantom lines in FIG. 1 and pulled outwardly away from the filter medium 12. The filter medium 12 can then be removed for replacement in the manner as described previously.

Spring retainer 14, as formed, is preferably formed of a round wire or rod which causes no abrasion or tearing of the filter medium in contact therewith. While the spring retainer 14 is described as being a round wire or rod, it may be formed of plastic or any other material having sufficient resiliency.

It is to be understood that various changes may be made to the specific embodiment shown and described without departing from the principles and spirit of the present invention.

What is claimed is:

1. A fluid treating filter assembly comprising: an inwardly extending channel-shaped in cross-section flow-through frame having opposed upstream and downstream openings therein providing spaced opposed marginal top and bottom flanges and defining a peripheral channel; a foraminous plate extending across at least one of said openings of said frame and supported on the adjacent flange thereof; a sheet of filter medium supported on said plate and having its marginal portions extending into said channel of said frame; and, a resilient endless spring retainer means pivotally attached to the flange along the other opening of said frame removably engaging said filter medium in said peripheral channel, said resilient endless retainer means being an endless loop having an inwardly extending groove portion opposite of and in alignment with the portion of said loop pivotally attached to said frame, said retainer means being so constructed that movement of said groove inwardly of said loop disengages said retainer from said frame.

2. The fluid treating filter of claim 1, said foraminous plate extending across said downstream opening.

3. The air filter assembly of claim 1, said sheet of filter medium being a nonwoven spun fiberglas material.

4. The fluid treating filter of claim 1, said flow-through frame being of generally rectangular configuration.

5. The air filter assembly of claim 4, said open sided frame of generally rectangular configuration includes two channel shaped side members substantially U-shaped in cross-section and two channel shaped end members substantially U-shaped in cross-section.

6. The air filter assembly of claim 5, said resilient endless retainer being pivotally attached to one channel shaped side member and adaptable for removable engagement with an opposite side member.

* * * * *